United States Patent [19]

Voegeli

[11] Patent Number: 5,155,642
[45] Date of Patent: Oct. 13, 1992

[54] ANISOTROPY CONFIGURATION FOR LONGITUDINALLY CONSTRAINED MAGNETORESISTIVE TRANSDUCERS

[75] Inventor: Otto Voegeli, Morgan Hill, Calif.

[73] Assignee: International Business Machines Corporation, Armonk, N.Y.

[21] Appl. No.: 714,325

[22] Filed: Jun. 11, 1991

Related U.S. Application Data

[63] Continuation of Ser. No. 443,302, Nov. 29, 1989, abandoned.

[51] Int. Cl.$^5$ .............................................. G11B 5/39
[52] U.S. Cl. ................................................... 360/113
[58] Field of Search ...................... 360/113; 338/32 R; 324/252

[56] References Cited

U.S. PATENT DOCUMENTS

| | | | |
|---|---|---|---|
| 3,848,217 | 11/1974 | Lazzari | 360/113 |
| 3,879,760 | 4/1975 | Lazzari | 360/113 |
| 3,887,944 | 6/1975 | Bajorek et al. | 360/113 |
| 3,945,038 | 3/1976 | Lazzari | 360/113 |
| 3,947,889 | 3/1976 | Lazzari | 338/32 R |
| 4,103,315 | 7/1978 | Hempstead et al. | 360/113 |
| 4,142,218 | 2/1979 | Gorter | 338/32 R |
| 4,306,215 | 12/1981 | Jeffers | 360/113 |
| 4,343,026 | 8/1982 | Griffith et al. | 338/32 R |
| 4,413,296 | 11/1983 | Jeffers | 338/32 R |
| 4,476,454 | 10/1984 | Aboaf et al. | 360/113 |
| 4,535,375 | 8/1985 | Mowry et al. | 360/113 |
| 4,626,946 | 12/1986 | Vinal | 338/32 R |
| 4,649,447 | 3/1987 | Huang et al. | 360/113 |
| 4,785,366 | 11/1988 | Krounbi et al. | 360/113 |
| 4,800,457 | 1/1989 | Kryder et al. | 360/113 |
| 4,803,580 | 2/1989 | Mowry | 360/121 |
| 4,833,560 | 5/1989 | Doyle | 360/113 |
| 4,896,235 | 1/1990 | Takino et al. | 338/32 R |

OTHER PUBLICATIONS

S. Middelhoek, "Static Reversal Processes in Thin Ni-Fe Films", IBM Journal of Research and Development, vol. 6, No. 4, Oct. 1962, pp. 394-406.

S. Middelhoek, "The Influence of the Anisotropy Variations on the Domain Behaviour of Ni-Fe Films", Symposium of the Electric and Magnetic Properties of Thin Metallic Layers, Leuven, Belgium, 1961.

Primary Examiner—John H. Wolff
Assistant Examiner—Craig A. Renner
Attorney, Agent, or Firm—Otto Schmid, Jr.; Leslie G. Murray

[57] ABSTRACT

A magnetoresistive (MR) read transducer comprising an MR layer having longitudinally magnetized end regions separated by a central active region and a soft magnetic biasing layer parallel to but spaced from the MR layer. The easy axes of the MR layer and the soft magnetic biasing layer are tilted at a small angle with respect to the longitudinal axis of the transducer and these angles are substantially equal, but in the opposite sense.

3 Claims, 3 Drawing Sheets

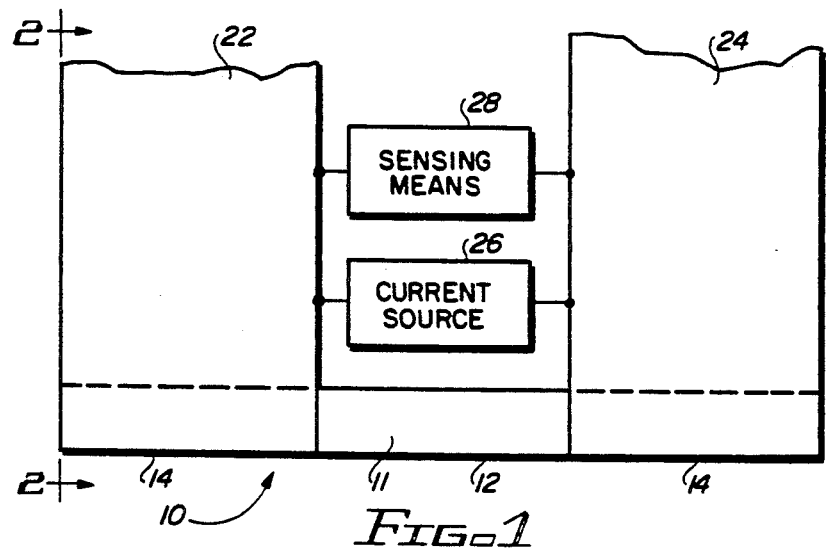
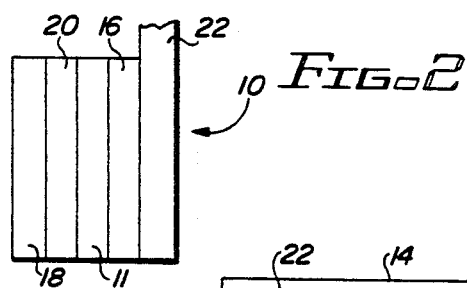
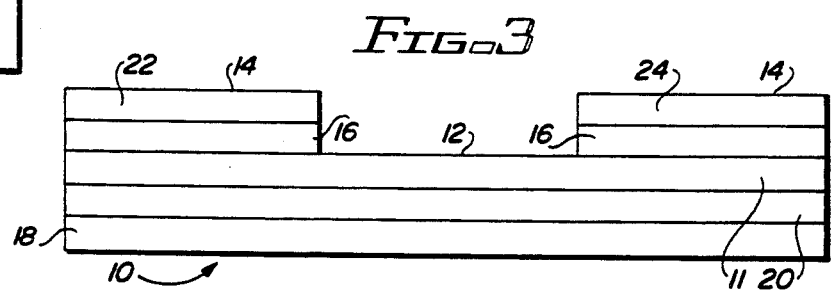
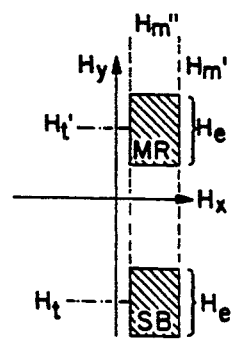
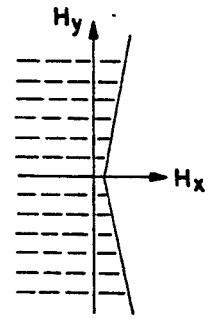
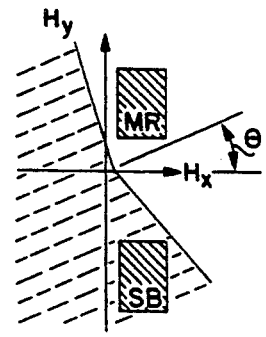

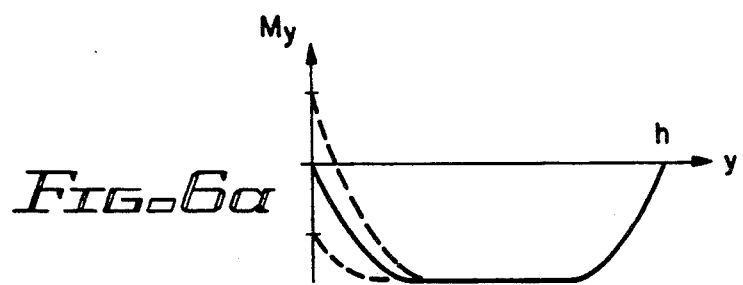
FIG_6a
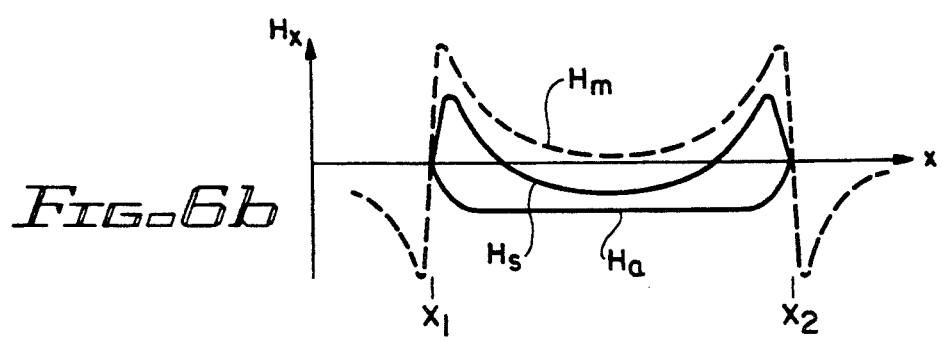
FIG_6b
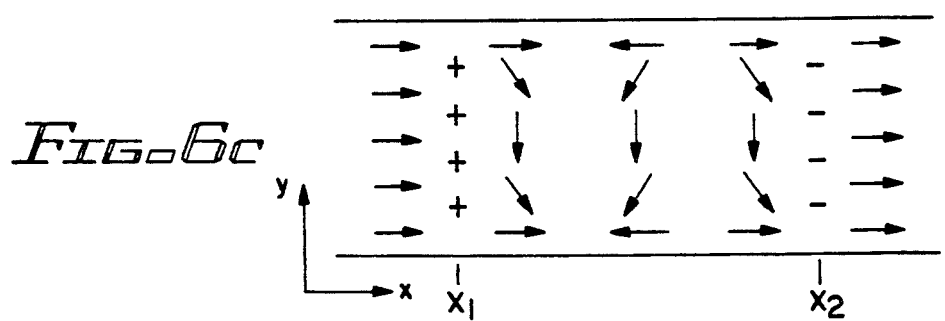
FIG_6c
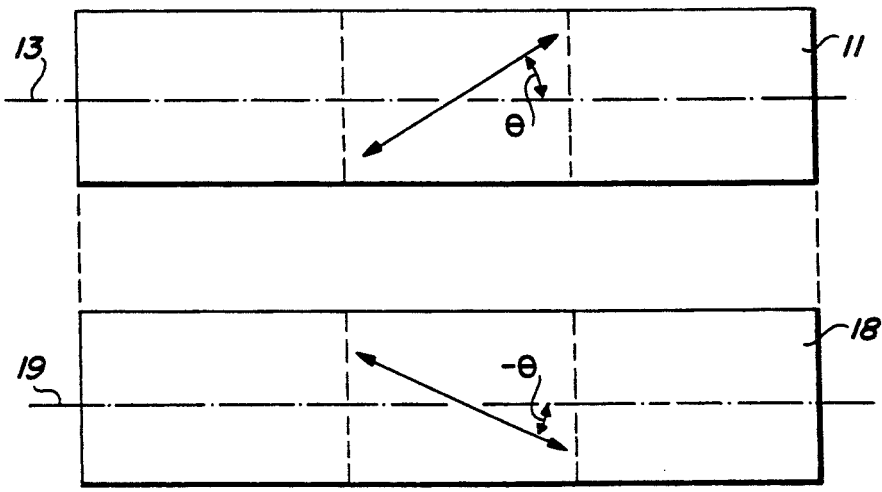
FIG_8

ANISOTROPY CONFIGURATION FOR LONGITUDINALLY CONSTRAINED MAGNETORESISTIVE TRANSDUCERS

This is a continuation of prior co-ending application Ser. No. 07/443,302, filed on Nov. 29, 1989, now abandoned.

This invention relates to thin film magnetic heads and, more particularly, to a magnetic head having a magnetoresistive read transducer.

DESCRIPTION OF THE PRIOR ART

The use of a magnetoresistive (MR) sensor to sense magnetically recorded data has been known for many years. It has also been known that both longitudinal and transverse bias must be provided to eliminate Barkhausen noise and to maintain the sensor in its most linear operating range.

Commonly assigned U.S. Pat. No. 3,887,944 discloses an integrated array of side-by-side MR read heads. To eliminate crosstalk between adjacent MR read heads, a region of high coercivity material is formed between adjacent MR sensors. One of the ways discussed to produce the region of high coercivity material is by exchange coupling between an antiferromagnetic material and the MR sensor.

U.S. Pat. No. 3,848,217 discloses an MR device which has the easy axis set at an angle of about 45 degrees with respect to the longitudinal axis of the sensor. The MR element is enclosed between two shields into one of which is induced a magnetization set 180 degrees from that in the MR element.

U.S. Pat. No. 4,535,375 shows an MR sensor in which a barber pole structure is provided to bias the sensor. The point of the invention is that the output signal is read over two of the spaced conductors forming part of the barber pole structure so that the output signal is read over the central region without any contribution from the end regions.

U.S. Pat. No. 4,649,447 discloses an MR sensor in which elongated attachments formed contiguous with the MR element are unidirectionally magnetized along their length to produce a bias at an angle to the longitudinal axis of the sensor.

The prior art does not show an MR sensor in which the easy axis of the MR element and the soft magnetic biasing layer are tilted at an acute angle to the longitudinal axis of the sensor which is substantially equal, but in the opposite sense.

SUMMARY OF THE INVENTION

It is therefore the principal object of this invention to provide a magnetoresistive (MR) sensor in which the easy axis of the MR element and the soft magnetic biasing layer are tilted at an acute angle to the longitudinal axis of the sensor which is substantially equal, but in the opposite sense.

In accordance with the invention, the MR read transducer comprises a thin film of magnetoresistive magnetic material having longitudinally magnetized end regions separated by a central region and a thin film of soft magnetic material parallel to but spaced from the MR layer. The MR layer has an easy axis which is tilted at a predetermined angle with respect to the longitudinal axis of the sensor, and the thin film of soft magnetic material has an easy axis tilted by substantially the same predetermined angle with respect to the longitudinal axis but having an opposite sense to that of the MR layer so that a transverse bias is produced in the central region of the transducer of a level sufficient to insure stable operating characteristics.

The foregoing and other objects, features and advantages of the invention will be apparent from the following more particular description of a preferred embodiment of the invention as illustrated in the accompanying drawing.

For a fuller understanding of the nature and advantages of the present invention reference should be made to the following detailed description taken in conjunction with the accompanying drawings.

BRIEF DESCRIPTION OF THE DRAWINGS

FIG. 1 is a plan view of a specific embodiment of a magnetoresistive (MR) transducer according to the present invention.

FIG. 2 is a section view taken along lines 2—2 of FIG. 1.

FIG. 3 is an end view of the MR transducer of FIGS. 1 and 2.

FIGS. 5a-5c comprise sketches showing the superposition of all magnetic fields acting on the MR transducer of FIGS. 1-3.

FIGS. 6a-6c comprise sketches showing the effect of changes in the magnetization profile of the MR transducer of FIGS. 1-3.

FIG. 8 is a sketch showing the magnetization configuration of the MR sensor layer and the soft magnetic layer according to the present invention.

DESCRIPTION OF THE PREFERRED EMBODIMENT

Figure 4A:
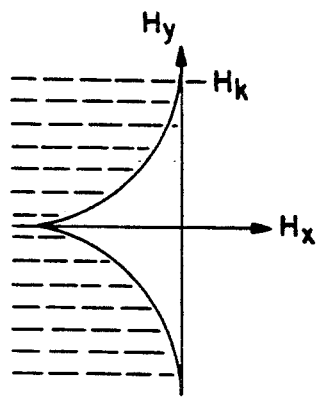
FIGS. 4a-4d comprise sketches showing the magnetic field applicable to an MR transducer.
Figure 4B:
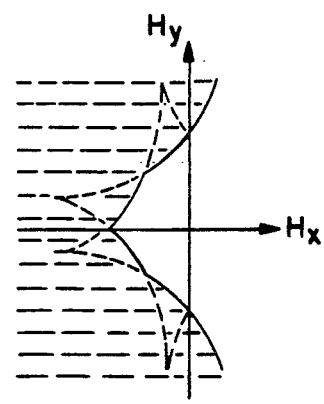
Figure 4C:
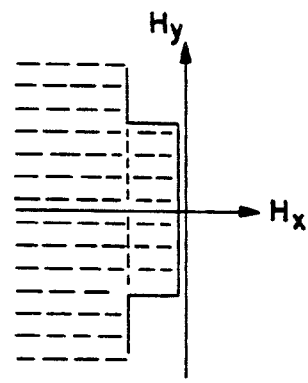

The magnetoresistive (MR) read transducer utilizes an MR sensor 10 (FIGS. 1-3), and the MR sensor 10 can be divided into two regions, the central active region 12, where actual sensing of data is accomplished, and end regions 14. The invention recognizes that the two regions should be biased in different manners. For stable operation the central active region 12 requires a longitudinal bias in addition to transverse bias. The longitudinal bias is provided by the longitudinally magnetized end regions 14. One method for producing the longitudinally magnetized end regions is by means of an exchange bias layer 16. Another method for producing the longitudinally magnetized end regions is by means of a hard magnetic layer. The transverse bias is produced by soft magnetic layer 18 which is separated from the MR layer 11 by a nonmagnetic spacer layer 20 whose purpose is to prevent, within the central active region 12, a magnetic exchange bias between the MR layer 11 and the soft magnetic film layer 18. Conductor leads 22 and 24 serve as the electrical path to conduct bias current from current source 26 to the MR sensor and to conduct the output signal to the external sensing means 28. The distance between the inner edges of conductor leads 22 and 24 comprises the part of the active region 12 over which the output signal is sensed.

The operating margins of such longitudinally constrained MR sensors can be substantially improved by tilting the induced anisotropy in the MR film 11 and the soft magnetic layer 18 in opposite directions as will be shown in the following discussion.

The response of a ferromagnetic film, such as the MR film 11, to varied field excursions is shown in FIG. 4. $H_x$ and $H_y$ are the components of applied field, and $H_k$ is the magnitude of induced anisotropy (having its "easy axis" aligned with the x-axis). The figure shows that the mode of response depends on the applied field excursion relative to the film's anisotropy as was discussed by S. Middelhoek in "Static Reversal Processes in Thin Ni-Fe Films", IBM Journal of Research and Development, Vol. 6, No. 4, October 1962. For example, the "critical curve" shown in FIG. 4a represents the boundary from "coherent rotation" into the (shaded) region of "incoherent switching". In an MR sensor, excursions across this "critical curve" must be avoided. The usable range is further restricted, as shown in FIG. 4b, because there also exists local dispersion of anisotropy. Another limitation is due to wall motion whose threshold is shown in FIG. 4c, statically determined by a coercivity, $H_w$' but further reduced dynamically by a mechanism called wall-creeping.

Figure 4D:
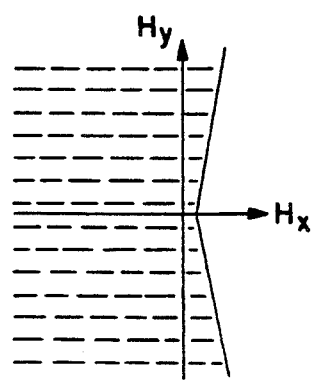

The usable operating range is the intercept of all the nonshaded areas, and such a range with some safety margin is shown in FIG. 4d with minor simplifications. The MR sensor must be designed to confine the excitation to stay within these margins, and this can be done by adjusting either the margins or the range of excitation. The former is accomplished through changes in the anisotropy, and the latter by using bias fields to shift the range of excitation.

FIG. 5a shows the superposition of all static and dynamic fields acting on the MR sensor layer 11 and the soft magnetic layer 18. In this figure, $H_e$ is the excitation from the recording medium, $H_t$ is the current-produced transverse bias on soft magnetic layer 18, while $H_t$' is the associated bias on the MR sensor layer 11. A magnetostatic stabilizing field serves to shift the excitation to the right. This field originates from the end regions 14 with a value $H_{m'}$ that decreases to $H_{m'}$, in the middle of the active region 12. The MR sensor layer 11 can be provided with the widest margins relative to the range of excitation shown in FIG. 5b, when the anisotropy is rotated by a small angle in the range of about 5 to about 30 degrees. The thus modified margins are shown in FIG. 5c.

By reference to FIG. 5c, it can be seen that canting has widened the margins for the MR sensor layer 11, but the contrary has happened to the soft magnetic layer 18. This may create problems, as shown in FIG. 6a, which shows the quiescent magnetization profile $M_{y'}$ and the modulations thereof in response to positive and negative values of excitation. FIG. 6b shows the condition of the soft magnetic layer 18 in greater detail. In effect, the canted anisotropy creates a longitudinal field, $H_{a'}$ which, because of opposite transverse bias, has opposite polarity in the MR sensor layer 11 and the soft magnetic layer 18. The sense of canting has been chosen so that in the MR sensor layer 11, $H_a$ adds to the magnetostatic field, $H_m$. Consequently, the two fields subtract in the soft magnetic layer 18. But worse, the profile of the two fields, is such that the combined stabilizing field, $H_s$' reverses its polarity within the active region 12. As shown in FIG. 6c, this results in a "buckled" magnetization configuration. In continuous films, buckling is a recognized cause of open hard-axis loops as was discussed by S. Middelhoek in "The Influence of the Anisotropy Variations on the Domain Behaviour of Ni-Fe Films", Symposium of the Electric and Magnetic Properties of Thin Metallic Layers, Leuven, Belgium, 1961. It does so by retaining the magnetization in a locked state until, at some field threshold, released by a switching process. Buckling would cause similarly irreversible responses in the soft magnetic layer 18 whenever the excitation exceeds the switching threshold. But even short of that, it means that the MR read transducer's response varies with the buckling configuration.

Figure 7A:
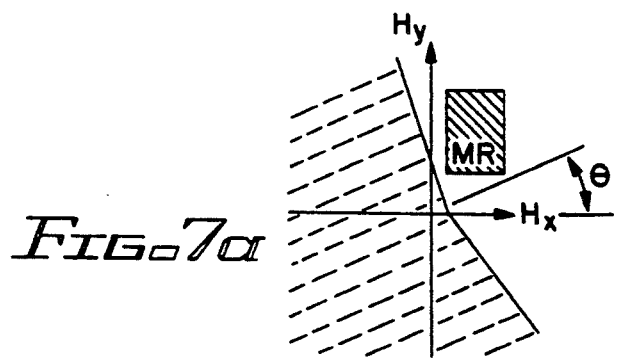
FIGS. 7a-7b comprise sketches showing the magnetic field applicable to the MR layer and the soft magnetic layer respectively when their easy axis is canted in opposite directions according to the present invention.
Figure 7B:
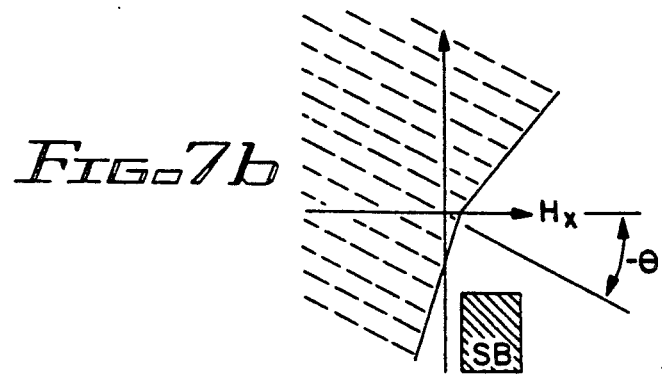

To guarantee a coherent rotation response requires a unidirectional stabilizing field to tilt the magnetization from the hard axis. The tilt must be large enough to exceed the angular dispersion of the magnetization. Now in principle, the stabilizing field on the soft magnetic layer could have the same or opposite polarity as the one acting on the MR sensor layer. Depending on the choice, the magnetization of the two films responds to an excitation with identical or opposite sense of rotation. In a design to produce both anisotropy as well as magnetostatic bias, the easy axis of the soft magnetic layer is canted counter (by an angle $-\theta$) to the one of the MR sensor layer. That design will make the anisotropy and magnetostatic contributions to the stabilizing field additive not only in the MR sensor layer, but also in the soft magnetic layer. The consequences of this design are shown in FIG. 7 which shows the resultant coherent rotation margins.

The design is implemented by setting the easy axis direction by applying a magnetic field in the desired direction during deposition of the layers. As shown in FIG. 8, the MR sensor layer 11 has the easy axis oriented at an angle $\theta$ to the longitudinal axis 13 of layer 11, and the soft magnetic layer 18 has its easy axis oriented at an angle $-\theta$ to the longitudinal axis 19 of layer 18.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new, and desire to secure by Letters Patent is:

1. A magnetoresistive read transducer assembly comprising:

a thin film magnetoresistive conductive layer formed of magnetic material, said magnetoresistive conductive layer having longitudinally magnetized end regions separated by a central region, and a longitudinal axis aligned parallel to said magnetoresistive conductive layer; and a thin film of soft magnetic bias material parallel to but spaced from said magnetoresistive conductive layer;

said thin film magnetoresistive conductive layer having an easy axis which is tilted at a predetermined angle with respect to said longitudinal axis, said thin film of soft magnetic bias material having an easy axis tilted by an angle substantially the same as said predetermined angle with respect to said longitudinal axis but having an opposite sense of tilt to the easy axis of said thin film magnetoresistive conductive layer whereby a transverse bias is produced in said central region of said transducer assembly of a level sufficient to insure stable operating characteristics.

2. The magnetoresistive read transducer assembly of claim 1 wherein said predetermined angle is an acute angle.

3. The magnetoresistive read transducer assembly of claim 2 wherein said predetermined angle is between about 5 and 30 degrees.

* * * * *